Jan. 14, 1958
C. F. MARTIN
2,819,508
PIPE LINING DEVICE
Filed March 1, 1954
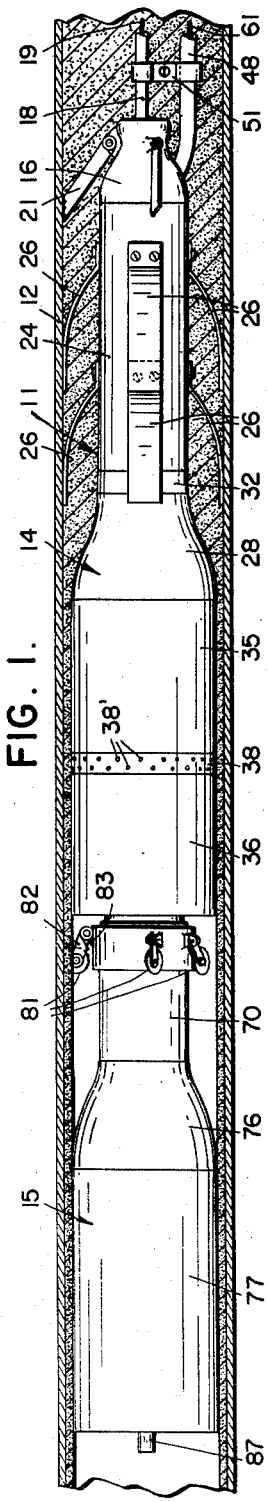
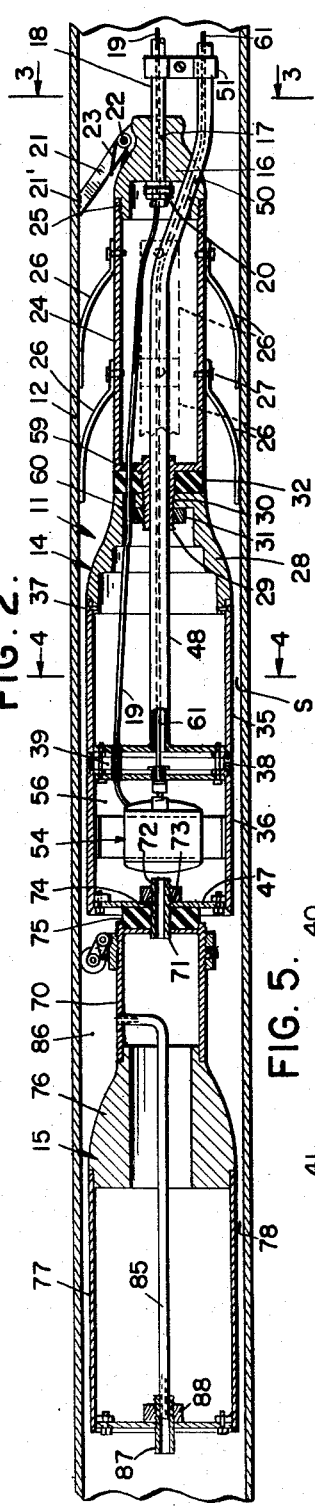
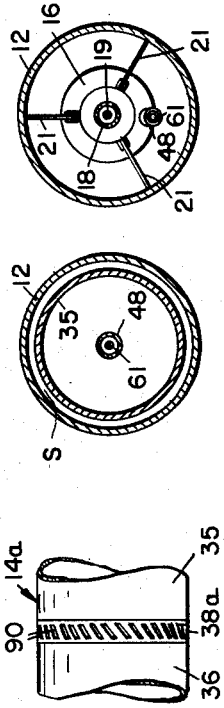
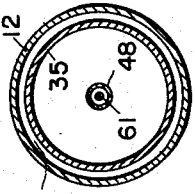
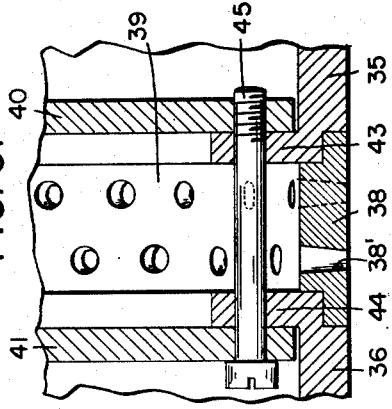
INVENTOR
CHARLES F. MARTIN
BY
*Mason & Graham*
ATTORNEYS United States Patent Office 2,819,508
Patented Jan. 14, 1958

2,819,508

PIPE LINING DEVICE

Charles F. Martin, Houston, Tex., assignor to Pipe Linings, Inc., a corporation of Delaware Application March 1, 1954, Serial No. 413,129

2 Claims. (Cl. 25—38)

This invention has to do with the lining of pipe in place with cementitious material and particularly with lining machines or devices of the type wherein a charge of lining material is placed in the pipe ahead of the device and the latter pulled through the pipe to spread and trowel the lining material into a thin lining over the inner surface of the pipe.

One of the difficulties experienced in lining pipe by drawing a device through the pipe to spread the lining material over the inner surface of the pipe has been the tendency of such devices to deposit excess lining material along the lower portion of the pipe. This is disadvantageous in that it wastes material, reduces the usable cross-sectional area of the lined pipe and makes it difficult, if not impossible, to send a cleaning device through the pipe by fluid pressure behind it when cleaning might subsequently become necessary.

An object of my invention is to provide a novel and improved type of pipe lining machine or device of the type which is pulled or drawn through the pipe to spread the lining material.

A particular object of the invention is to provide a pipe lining device of the type indicated which makes is possible to prevent the deposit of excess material along the bottom of the pipe and in this connection it is an object to provide a device which is particularly suitable for use with a somewhat more plastic type of mortar than has heretofore been used in the lining of pipe.

A further object is to provide a device which relieves the lining material of excess air as the material is spread and compacted against the wall of the pipe. In this connection it is an object to provide a device of the type indicated which includes means for relieving air from the lining material as it is applied to and pressed against the wall of the pipe in such a manner that the air relieved is conducted forwardly of the machine and the charge of lining material ahead of the machine.

Another object is to provide air relief passage means which extends through a portion of the machine and forwardly thereof and to provide means for keeping the relief passage open.

A still further object is to provide a novel method of lining pipe with a cementitious material which is easier to carry out than the conventional pipe lining methods of the type wherein a device is drawn through a pipe against a charge of lining material and which provides a superior lining.

These and other objects will be apparent from the drawing and the following description. Referring to the drawing:

Fig. 1 is a sectional view of a pipe to be lined showing a pipe lining device therein embodying the invention and a supply of mortar being applied to the pipe;

Fig. 2 is a longitudinal sectional view of the pipe lining device;

Fig. 3 is a cross section on line 3—3 of Fig. 2;

Fig. 4 is a cross section on line 4—4 of Fig. 2;

Fig. 5 is an enlarged fragmentary sectional view in the same plane as Fig. 2 of a portion of the apparatus; and Fig. 6 is a fragmentary elevational view of a modified structure.

More particularly describing the invention, referring first to Fig. 1, I show a pipe lining machine or device 11 which is drawn through the pipe 12 to be lined by suitable pulling force exerted upon a cable 18 attached to the forward end of device 11. The cable may extend several hundred feet ahead of the pipe lining device.

In the lining of pipe in place, charges of mortar are placed in the pipe ahead of the device at spaced intervals along the pipe. As the device is pulled through the pipe it serves to spread and trowel a thin layer of the mortar over the inner surface of the pipe to line the same. Thus the space between the periphery of the trailing section of the device 11 and the interior of the pipe 12 corresponds to the thickness of the lining desired.

Referring now to Figs. 2–5 for a more detailed description of the invention, the pipe lining device or machine 11 includes a forward or lead unit 14 and a rear or trailing unit 15. Depending upon the size of the pipe being lined and the amount of charge which is placed ahead of the device one or more trailing units 15 may be employed to successively reduce the thickness of the lining applied to the pipe until the proper thickness is obtained.

The lead unit 14 includes a nose 16 having a central bore 17 to accommodate the cable 18 used for advancing the device 11 through the pipe. The cable 18 may be a single conductor cable carrying an insulated wire 19 for a purpose to be described. With the exception of the inner electrical conductor the cable 18 terminates rearwardly of the nose 16 and is retained by a clamp 20.

Mounted on the nose are a plurality of brake arms 21 pivoted at 22 and urged outwardly by springs 23. These prevent backward movement of the device as might occur from the introduction of a charge of mortar ahead of the device, the ends 21' of the arms being serrated to prevent slippage.

Attached to the nose is a cylindrical, hollow guide tube 24 which is shown as threadedly secured to the nose at 25. Member 24 carries a plurality of guide springs 26 which consist of leaf springs secured at their forward ends as by screws 27 and having trailing free end portions engageable with the inner surface of pipe 12 as shown in the drawing. The springs serve to center the lead unit in the pipe.

Rearwardly of the guide tube is a tapered intermediate section 28 which is secured to tube 24 by means of a cylindrical extension 29 on the tube, the latter being threaded at 30 to receive a nut 31. Preferably a rubber or rubber-like washer 32 is provided between parts 28 and 24.

Rearwardly of the connecting section 28 the main section of the lead unit 14 provides a cylindrical casing which is made up of a forward cylindrical section 35 and a rear cylindrical section 36, the forward section being secured to member 28 by screws 37. Between the sections 35 and 36 is an apertured ring 38 which provides access to the interior of a space 39 defined by end plates 40 and 41 at the adjacent ends of the sections 35 and 36. The end plates 40 and 41 are positioned adjacent inner flanges 43 and 44 upon sections 35 and 36, respectively, and the parts secured by a plurality of bolts 45. I also provide a rear wall 47 at the trailing end of section 36.

With the construction shown it will be apparent that as the device is drawn through the pipe the mortar is squeezed out into the peripheral space S between pipe 12 and the main section of the lead unit 14, this space being somewhat greater in cross-sectional thickness than that of the completed lining. In originally obtaining the required consistency of the mortar, in the mixing process, a certain amount of air is entrapped in it and it is one of the features of my invention that I am able to relieve the mortar of excess air as the lead unit is drawn through the pipe. The air escapes through holes 38' in the ring into the space 39 between the plates 40, 41. The air can then escape forwardly through a relief tube 48 communicating with space 39 and welded or otherwise secured to the plate 40. The tube 48 extends forwardly through the tubular extension 29 and through guide tube 24 and outwardly through an appropriate aperture 50 in nose 16. This tube is carried forward for several feet ahead of the machine and may be secured to the cable 18 as by suitable clamps 51, it being the purpose to have the tube sufficiently long that it will extend ahead of the charge of mortar in the pipe ahead of the device.

I provide means for keeping the relief tube 48 open, since this might otherwise become clogged by mortar escaping with the air into space 39 and the tube. A motor 54 is mounted in compartment 56 within the rear portion of the main section of the unit 14. The motor is supplied with current through conductor 19 of the cable which passes through the various walls intervening between the end of the cable portion 18 and the motor, suitable grommets 59 and 60 being provided. The motor can be grounded to the device and thereby to the pipe through which a circuit can be completed. The motor rotates a flexible wire 61 which extends from the motor forwardly through the tube 48. The speed of rotation of the wire need not be high and about 40 to 50 R. P. M. is sufficient.

The trailing unit 15 comprises a tubular forward section 70 which has a tubular extension 71 threaded at 72 to receive a nut 73 within motor compartment 56 of the forward unit, the extension 71 being received in a hole 74 of wall 47 of the lead unit. A rubber gasket or the like 75 is provided between the parts. The trailing unit also includes an intermediate tapered section 76 and a skirt or rear section 77. Where only one trailing unit is used, the diameter of section 77 is such that the annular space 78 has a cross-sectional area equal to that of the desired cross-sectional area of the lining. The intermediate section may be welded to the forward section 70 and the skirt or trailing portion 77 may also be welded to the intermediate section 76.

At its forward end, unit 15 carries a plurality of circumferentially spaced centering wheels 81 carried by pivotally mounted arms 82 which are biased outwardly by suitable springs 83. The wheels 81 should be disk-like and relatively thin so as to only produce a minimum-width groove in the lining of the pipe.

I also provide an open vent tube 85 in the trailing unit, the forward end of which is mounted in the forward section 70 so that it communicates with the space 86 preventing any undue build-up of pressure at this point. The rearward end of this tube is mounted in nipple 87 carrying nut 88.

In Fig. 6 I show a modification of the apparatus wherein 14a designates a lead unit generally similar to unit 14 but differing therefrom in having a ring member 38a provided with a series of angular, circumferentially spaced slots 90 for the escape of air from the mortar into the machine and thence out through the relief tube previously described.

In the lining of pipe I prefer to use a special type of mortar which, so far as I know, has never been used for this purpose. This mortar comprises sand, hydraulic cement, water, and a substance which, with water, is capable of forming a colloidal mass. I have found bentonite to be especially suitable, but other substances having the same general characteristics may be used. In preparing the mortar, the cement, sand and water are mixed in a conventional manner, after which the bentonite is added and mixed in. More water can be included in the mix than would be possible with ordinary mortar, since the bentonite holds the excess water. A typical mortar would contain about 1½ parts sand, 1 part cement, and bentonite to an amount of about from 3% to 6% by weight of the cement. The ratio of sand to cement is, of course, not critical. I prefer to use about 5% bentonite. Sufficient water is used to provide a relatively plastic mortar.

I find that by using bentonite I obtain a mortar which is very plastic and much easier to apply than conventional lining mortars and which also has a greater tendency to cling to the pipe and be self-supporting as it is applied as a lining. My mortar is thus extremely plastic under the influence of an applying device without being watery or too fluid.

In mixing, air is inevitably entrapped in the mortar. In my method of lining pipe, I eliminate objectionable quantities of air from the mortar as I apply the mortar to the pipe in the form of a thin lining. In the apparatus which I have shown and described I relieve the excess air through the holes 38' (or slots 90) and conduct the air to a point ahead of the charge of mortar in the pipe through the relief tube 48.

In the use of the apparatus, a charge of cement mortar is placed in the pipe immediately ahead of the apparatus. The pipe lining device is then drawn through the pipe by means of cable 18 which may extend several hundred feed ahead. As the device is advanced, the unit 14 serves to spread a layer of mortar on the pipe wall and relieve the mortar of excess air as above described. The relief tube 48, which extends forward of the charge of mortar ahead of the machine, is kept open by the rotating wire 61 therein driven by motor 54. The trailing unit serves to trowel the lining of mortar and reduce its thickness to the desired dimension.

Although I have illustrated and described certain forms of my invention, I contemplate that various changes and modifications can be made without departing from the invention, the scope of which is defined by the following claims.

I claim:

1. In pipe lining apparatus, a device adapted to be drawn through a pipe to be lined against a charge of mortar, comprising an elongated tubular body including a cylindrical main section and a guide tube section forwardly thereof, said guide tube section having a diameter substantially less than said main section, circumferentially spaced guide springs on said guide tube section for engaging the pipe to be lined whereby to center said body in said pipe, said main section having a plurality of circumferentially spaced air relief openings through the wall of the section, an open air relief tube in said body having one end communicating with said air relief openings, said air relief tube extending forwardly of said body a substantially distance, a motor in said body, and a flexible wire extending loosely in said relief tube operatively connected to the motor to be rotatively driven thereby.

2. In pipe lining apparatus, a device adapted to be drawn through a pipe to be lined against a charge of mortar, comprising an elongated tubular body and a guide tube section forwardly thereof, said guide tube section having a diameter substantially less than said main section, circumferentially spaced guide springs on said guide tube section for engaging the pipe to be lined whereby to center said body in said pipe, a plurality of circumferentially spaced rearwardly inclined brake arms pivotally mounted at their forward ends on said guide tube section about axes normal to the longitudinal axis of the guide tube section, and spring means urging the free ends of said arms outwardly into engagement with the pipe.

References Cited in the file of this patent

UNITED STATES PATENTS

| | | |
|---|---|---|
| 126,100 | Stephens | Apr. 23, 1872 |
| 1,548,161 | Newsom | Aug. 4, 1925 |
| 1,627,952 | Brookby | May 10, 1927 |
| 1,629,292 | Newsom | May 17, 1927 |
| 1,650,864 | Collings | Nov. 29, 1927 |
| 1,951,221 | Tate | Mar. 13, 1934 |
| 2,369,719 | Crane | Feb. 20, 1945 |
| 2,377,615 | Crane | June 5, 1945 |
| 2,555,377 | Scott | June 5, 1951 |

FOREIGN PATENTS

| | | |
|---|---|---|
| 104,616 | Australia | Aug. 4, 1938 |